United States Patent [19]

Ritsko et al.

[11] Patent Number: 4,578,251

[45] Date of Patent: Mar. 25, 1986

[54] REMOVAL OF CHROMIUM FROM COBALT

[75] Inventors: Joseph E. Ritsko; Howard L. Acla, both of Towanda, Pa.

[73] Assignee: GTE Products Corporation, Stamford, Conn.

[21] Appl. No.: 718,244

[22] Filed: Apr. 1, 1985

[51] Int. Cl.$^4$ ................... C01G 37/02; C01G 51/00
[52] U.S. Cl. ........................................ 423/55; 423/53; 423/140; 423/143
[58] Field of Search ............. 423/53, 55, 140, 143

[56] References Cited

U.S. PATENT DOCUMENTS

| | | | |
|---|---|---|---|
| 3,224,874 | 12/1965 | Daugherty | 423/55 |
| 3,544,309 | 12/1970 | Fletcher et al. | 423/55 |
| 3,975,495 | 8/1976 | Bowerman | 423/140 |
| 4,042,474 | 8/1977 | Saarinen | 423/140 |

*Primary Examiner*—Herbert T. Carter
*Attorney, Agent, or Firm*—Donald R. Castle

[57] ABSTRACT

A process is disclosed for removing chromium from cobalt. The process involves first contacting an acidic cobalt chloride solution with an oxidizing agent, followed by adjusting the pH to from about 3.2 to about 5.5 with a base at a sufficient temperature to form a first solid containing essentially all of the chromium and a portion of the cobalt and a first liquor containing the balance of the cobalt, and then separating the first solid from the first liquor. The first solid is then heated at a sufficient temperature to remove essentially all of the water and form a second solid which is contacted with sufficient water and ammonium hydroxide to form a slurry which is at a pH of greater than about 3.8. The slurry is made up essentially of a second liquor which contains essentially all of the cobalt which was present in the second solid and a third solid which contains essentially all of the chromium which was initially present in the acidic cobalt chloride solution and which is then separated from the second liquor.

5 Claims, No Drawings

REMOVAL OF CHROMIUM FROM COBALT

FIELD OF THE INVENTION

This invention relates to a process for removing chromium from cobalt. More particularly it relates to a process for removing chromium from acidic cobalt chloride solutions by forming a solid containing the chromium and washing the solid to recover the cobalt contained in the solid.

BACKGROUND OF THE INVENTION

There have been a number of processes for removal of chromium from cobalt.

One process involves spray drying cobalt chloride solutions in concentrated hydrochloric acid in a ceramic dryer spray. This described in a paper entitled, "Chemical Processes for the Working up of Nickel and Cobalt Raw Materials" by A. Van Petegheim, H. Willekens, and B. Tougarinoff in Metallurgie—Hoboken.

Another method is to roast or fuse cobalt containing material with sodium carbonate forming the water soluble sodium chromate.

Still another method involves a two step precipitation of chromium from a very dilute cobalt solution. This is described in a paper entitled, "Recovery of Cobalt from Metallurgical Wastes", by D. Pearson, Warren Spring Lab—United Kingdom.

There are numerous solvent extraction methods. Bureau of Mines Report No. R17316 entitled "Chemical Reclaiming of Superalloy Scrap" by P. T. Brooks, G. M. Potter, and D. A. Martin, describes a process for recovering nickel, cobalt, molybdenum, and chromium from superalloy grindings. The process involves dissolving the metals in hot chlorinated acidic liquor, carbon absorption, solvent extraction separations, and chemical precipitations.

Some of the above named methods involve special equipment. A process in which chromium is efficiently removed from cobalt without special equipment would be desirable.

SUMMARY OF THE INVENTION

In accordance with one aspect of this invention, there is provided a process for removing chromium from cobalt. The process involves first contacting an acidic cobalt chloride solution with an oxidizing agent to oxidize the cobalt and other metallic elements, such as iron, contained therein, followed by adjusting the pH to from about 3.2 to about 5.5 with a base at a sufficient temperature to form a first solid containing essentially all of the chromium and a portion of the cobalt and a first liquor containing the balance of the cobalt, and then separating the first solid from the first liquor. The first solid is then heated at a sufficient temperature to remove essentially all of the water and form a second solid which is contacted with sufficient water and ammonium hydroxide to form a slurry which is at a pH of greater than about 3.8. The slurry is made up essentially of a second liquor which contains essentially all of the cobalt which was present in the second solid, and a third solid which contains essentially all of the chromium which was initially present in the acidic cobalt chloride solution and which is then separated from the second liquor.

DETAILED DESCRIPTION OF THE INVENTION

For a better understanding of the present invention, together with other and further object, advantages, and capabilities thereof, reference is made to the following disclosure and appended claims in connection with the above description of some of the aspects of the invention.

By the process of this invention, chromium is removed from acidic cobalt chloride solutions by adjusting the pH of the solution to form a solid of containing the chromium. The solid is then treated to recover the cobalt contained therein.

The starting acidic hydrochloric acid solution can be from any source. Most typically, the cobalt chloride solutions of this invention are obtained by treating cobalt containing material such as stellite scrap. Stellites are heat resistant, corrosion resistant, high temperature and oxidation resistant alloys of tungsten, chromium, cobalt, and carbon. Typical weight compositions of stellites are from about 3% to about 15% tungsten, from about 25% to about 35% chromium, from about 45% to about 65% cobalt, and from about 0.5% to about 2.75% carbon. The stellite scrap starting material of this invention is most typically scrap material resulting from grinding and machining operations. The material can also have some contamination by aluminum oxide and silica from grinding wheels. The cobalt containing material is added to water, preferably in a weight ratio of about 1 part of the material to about 5 parts of water. The water is preferably at about 50° to about 60° C. and contains a small amount of a surfactant or detergent. The resulting cobalt material-water-surfactant or detergent mixture is then slurried for preferably about ½ hour. This washing operation is done to remove any oils which can be initially on the material. The cobalt material is then separated from the wash water, surfactant or detergent, and oils by any standard technique such as by filtration. If the oil is not adequately removed, the material is reslurried in additional water and surfactant or detergent as described above.

The resulting cobalt containing material which contains chromium and other impurities, is then added, preferably slowly, over about a 2 hour period to concentrated hydrochloric acid which is preferably from about 10 molar to about 12 molar at a temperature of above about 75° C. and preferably from about 90° C. to about 100° C. Most preferably about 1 part by weight of the material is added to from about 3 to about 4 parts by weight of concentrated hydrochloric acid. The resulting mixture of cobalt containing material and hydrochloric acid is then heated for about an additional 2 hours. The resulting heated mixture is then diluted with about 1.25 parts by weight of water. The resulting solid is then removed from the resulting hydrochloric acid solution which contains essentially all of the cobalt and chromium and other impurities as Fe by any standard technique such as filtration. This cobalt containing hydrochloric acid solution is then used as the starting material for the process of this invention. This solution typically contains from about 20 to about 25 grams of cobalt per liter, from about 20 to about 25 grams of chromium per liter, about 20 grams tungsten per liter, from about 20 to about 25 grams of iron per liter, and from about 10 to about 13 grams of nickel per liter.

The hydrochloric acid solution is then contacted with an oxidizing agent to oxidize the cobalt and other metallic elements contained therein, such as iron. Generally any oxidizing agent can be used. Addition of hydrogen peroxide and bubbling air into the solution are the preferred methods. Slow addition of hydrogen peroxide is the most preferred because any excess hydrogen peroxide present is desirable for oxidations in any subsequent operations to which the resulting solution is subjected. The resulting solution is then adjusted to a pH of from about 3.2 to about 5.5 with a base. Generally any base can be used but it is preferred to use ammonium hydroxide because the ammonia is compatible with subsequent treatment to which the resulting solution is subjected. For example, the resulting solution can be treated to form cobalt pentamine. The temperature at which the pH adjustment is carried out is preferably from about 50° C. to about 60° C.

As a result of the pH adjustment a first solid is formed which contains essentially all of the chromium and a portion of the cobalt and a first liquor is formed which contains the balance of the cobalt, which is usually about 50% by weight of the starting cobalt. The first solid contains chromium essentially as chromium hydroxide. If iron and aluminum are present in the starting hydrochloric acid solution, their respective hydroxides are also present in the first solid. The cobalt in the first solid is present essentially as cobalt chloride which has been absorbed on the hydroxides. The first liquor is essentially free of chromium and if iron and aluminum were initially present in the starting hydrochloric acid solution, the first liquor is free of these impurities as well, provided the oxidation is complete. It should be noted here that addition of the oxidizing agent can be continued until there is no further formation of the first solid.

The first solid is then separated from the first liquor by any standard technique such as by filtration.

The first solid is then heated at a sufficient temperature to remove essentially all of the water and form a second solid. The heating results in dehydration of the hydroxides. Heating is done preferably at from about 120° C. to about 300° C. and most preferably at about 150° C. At temperatures above about 300° C. ferric chloride volatilizes causing clean up problems. Therefore, care is taken to keep the temperature below about 300° C.

The resulting dried second solid is then contacted with sufficient water and ammonium hydroxide to form a slurry which is at a pH of at least about 3.8, and preferably about 4.0. Generally from about 3 to about 4 weight parts of water are added per part of dried second solid and the ammonium hydroxide is added as needed to adjust the pH. The slurry which forms is made up essentially of a second liquor which contains essentially all of the cobalt which had been absorbed or the hydroxides of the second solid, and a third solid. It is critical that the pH of the slurry be greater than about 3.8. At pH's below this value, the resulting third solid is colloidal and it is extremely difficult if not impossible to separate it from the resulting second liquor. At pH values about 3.8, the separation is accomplished with no difficulty and is done by any standard technique such as filtration.

The first and second liquors which contain the major portion of the cobalt which was initially present in the hydrochloric acid starting solution, usually at least about 95% by weight, can be combined and further processed to high purity cobalt.

The third solid which contains the major portion of the chromium which was initially present in the hydrochloric acid starting solution can be processed for recovery of the metals contained therein.

To more fully illustrate this invention, the following non-limiting example is presented. All parts, portions, and percentages are on a weight basis unless otherwise stated.

EXAMPLE

About 800 parts of stellite cobalt scrap is added to 3750 parts of water which is at about 50° C. to about 60° C. and which contains a small amount of surfactant or detergent. The resulting mixture is slurried for about ½ hour. This washing is done to remove any cutting oils that accompany the scrap. The resulting water and oils are then removed from the scrap by decantation followed by filtering. The moist scrap is then added slowly over about a 2 hour period to about 2880 parts of concentrated hydrochloric acid at a temperature of from about 90° C. to about 100° C. When all of the scrap has been added to the hydrochloric acid, the resulting mixture is then heated at the above temperature for about an additional 2 hours. The resulting heated mixture is then diluted with about 1000 parts of water and filtered. The resulting hydrochloric acid solution which contains essentially all of the cobalt which was initially present in the starting scrap and impurities as cobalt and other metallic impurities is then contacted with an oxidizing agent such as hydrogen peroxide or air which is bubbled through the solution. The resulting solution is then adjusted to a pH of from about 3.2 to about 5.5 with ammonium hydroxide at about 50° C. to about 60° C. to precipitate the hydroxides of chromium and those of iron and aluminum if the latter two are present. About 50% of the cobalt is absorbed by the hydroxides and is present in the resulting precipitate or solid. The solid is then separated from the resulting liquor by filtration. The resulting liquor is essentially free of chromium, iron, and aluminum, its concentration being from about 20 to about 25 grams of Co. per liter and from about 0.05 to about 0.10 grams of Cr per liter. The solid is then heated at from about 120° C. to about 300° C. to dehydrate the hydroxides. This dried solid is then slurried with water and ammonium hydroxide, the pH of the resulting slurry being greater than about 3.8 to remove the absorbed cobalt and form a liquor which contains essentially all of the cobalt which was initially present in the dried solid. The two liquors contain about 95% by weight of the cobalt which was initially present in the starting hydrochloric acid solution. While there has been shown and described what are at present considered to preferred embodiments of the invention, it will be obvious to those skilled in the art that various changes and modifications may be made therein without departing from the scope of the invention as defined by the appended claims.

What is claimed is:

1. A process for removing chromium from cobalt, said process comprising:
   (a) contacting a chromium containing acidic cobalt chloride solution with an oxidizing agent to oxidize the cobalt contained therein;
   (b) adjusting the pH of the resulting solution containing the oxidized cobalt and other metallic elements to a pH of from about 3.2 to about 5.5 with a base to form a first solid containing essentially all of the chromium as chromium hydroxide and a portion of the cobalt and a first liquor containing the balance of the cobalt;

(c) separating said first solid from said first liquor;

(d) heating said first solid at a sufficient temperature to remove essentially all of the water and form a second solid;

(e) contacting said second solid with sufficient water and ammonium hydroxide to form a slurry which is at a pH of greater than about 3.8, said slurry consisting essentially of a second liquor which contains essentially all of the cobalt which was present in said second solid and a third solid which contains essentially all of the chromium which was initially present in said acidic cobalt chloride solution; and (f) separating said third solid from said third liquor.

2. A process according to claim 1 wherein said oxidizing agent is selected from the group consisting of hydrogen peroxide and air.

3. A process according to claim 1 wherein said first solid is heated at from about 120° C. to about 300° C.

4. A process according to claim 1 wherein said base is ammonium hydroxide.

5. A process according to claim 1 wherein said first liquor and said second liquor contain at least about 95% by weight of the cobalt which is initially present in said acidic cobalt chloride solution.

* * * * *